United States Patent
Potter

[11] Patent Number: 6,017,835
[45] Date of Patent: Jan. 25, 2000

[54] GLASS COMPOSITIONS FOR PRODUCING DUAL-GLASS FIBERS

[75] Inventor: Russell M. Potter, Hebron, Ohio

[73] Assignee: Owens Corning Fiberglas Technology, Inc., Summit, Ill.

[21] Appl. No.: 08/147,759

[22] Filed: Nov. 5, 1993

[51] Int. Cl.[7] ............... C03C 13/00; C03C 3/085; B32B 7/00
[52] U.S. Cl. .................. 501/35; 501/16; 501/65; 501/66; 501/69; 501/70; 501/72; 428/369; 428/373; 428/370
[58] Field of Search ............... 501/35, 16, 65, 501/66, 69, 70, 72; 428/370, 373; 65/4.1; 420/371, 369

[56] References Cited

U.S. PATENT DOCUMENTS

| | | |
|---|---|---|
| 1,828,217 | 10/1931 | Barker . |
| 2,197,562 | 4/1940 | Reinker ........................ 501/16 |
| 2,693,668 | 11/1954 | Slater . |
| 2,927,621 | 3/1960 | Slater et al. . |
| 2,998,620 | 9/1961 | Stalego . |
| 3,073,005 | 1/1963 | Tiede . |
| 3,653,861 | 4/1972 | Stalego et al. . |
| 3,791,806 | 2/1974 | Koizumi et al. . |
| 3,881,903 | 5/1975 | Stalego . |
| 4,145,199 | 3/1979 | Russell . |
| 4,203,774 | 5/1980 | Battigelli et al. ................ 501/35 |
| 4,396,722 | 8/1983 | Rapp ............................... 501/35 |
| 4,707,399 | 11/1987 | Rambosek . |
| 5,055,428 | 10/1991 | Porter ............................. 501/66 |
| 5,071,793 | 12/1991 | Jean et al. ....................... 501/16 |
| 5,164,342 | 11/1992 | Muralidhar et al. ............. 501/16 |

OTHER PUBLICATIONS

Don Paul, Polymer Blends, Academic Press, 1978 No Month.

*Primary Examiner*—C. Melissa Koslow
*Attorney, Agent, or Firm*—Inger H. Eckert; Stephen W. Barns

[57] ABSTRACT

Compositions for producing irregularly-shaped dual-glass fibers include a first glass composition and a second glass composition, the first and second glass compositions having nonidentical coefficients of thermal expansion, the difference between the coefficients of thermal expansion being greater than about 2.0 ppm/° C.

20 Claims, 4 Drawing Sheets

GLASS COMPOSITIONS FOR PRODUCING DUAL-GLASS FIBERS

TECHNICAL FIELD

This invention relates to glass compositions for producing glass fibers and, more specifically, to dual-glass compositions for producing glass fibers for insulation and structural products.

BACKGROUND OF THE INVENTION

Small diameter glass fibers are useful in a variety of applications the most important of which is as acoustical or thermal insulation materials. When these small diameter glass fibers are properly assembled into a lattice or web, commonly called a wool pack, fibers which individually lack strength or stiffness can be formed into a product which is quite strong. The glass fiber insulation material which is produced is lightweight, highly compressible and resilient.

The common prior art methods for producing glass fiber wools involve forming wool batts using primarily straight glass fibers and then compressing these batts into packages for shipping. Unfortunately, glass fiber products currently produced have several common problems. First, during their attenuation, the individual, primarily straight fibers tend to align themselves with each other to form rope-like structures. These structures lead to local variation in wool pack fiber density, decreasing the insulating value of the material. Second, it is necessary to use some material, commonly a phenol-formaldehyde resin, to bind the fibers together. Last, under sufficiently high compression, fiber fracture reduces the ability of the wool batt to recover to its designed thickness. Thus, there is a need for an improved glass fiber product which will withstand greater compression and provide greater entanglement of the fibers within the product. Also, it is desirable to provide a more uniform, less ropey fiber structure in the insulation product.

Attempts have been made in the prior art to produce curly glass fibers for use as staple fibers and to produce glass fiber mats with high entanglement. Stalego in U.S. Pat. No. 2,998,620 discloses helical curly glass fibers of bicomponent glass compositions. Stalego teaches producing curly fibers by passing two glass compositions of differing degrees of thermal expansivity through the orifices of a spinner. The glasses are extruded in aligned integral relationship such that the fibers curl naturally upon cooling due to the differing thermal expansivity.

However, the glass compositions disclosed by Stalego are not suitable for rotary forming technology. For example, in the glass pairs Stalego discloses, E glass is the low thermal expansion glass. In order for a glass to form satisfactorily in the rotary process, the glass must enter the spinner at temperatures close to that at which it has a viscosity of 1000 poise. At this viscosity E glass has a temperature near 2190° F. (1200° C.) which is high enough to cause rapid damage to the metals from which the spinners are made. This effectively prohibits the use of E glass for the extended periods necessary for commercial production. To varying degrees, similar problems exist with all of the high thermal expansion glasses disclosed by Stalego.

Tiede in U.S. Pat. No. 3,073,005 discloses a nonrotary process for making bicomponent curly glass fibers. The fibers are made by feeding differing glass compositions to an orifice in side by side contact such that the two glasses are attenuated into a single fiber. Since Tiede discloses the same glass composition as Stalego, he does not disclose glass compositions useful for commercial production of glass fiber products by the rotary process.

Accordingly, a need exists for improved glass compositions useful for producing glass fibers that would exhibit improved recovery and thermal conductivity when produced by the rotary process.

SUMMARY OF THE INVENTION

This need is met by the present invention whereby dual-glass compositions are provided which are useful in producing irregularly-shaped glass fibers by extrusion from orifices of a spinner in a rotary process.

In accordance with the preferred embodiment of the present invention there is provided a dual-glass composition for producing irregularly-shaped glass fibers. The dual-glass composition comprises at least a first glass composition and a second glass composition. The first and second glass compositions have nonidentical coefficients of thermal expansion, the difference being greater than about 2.0 ppm (parts per million)/° C., preferably greater than about 4.0 ppm/° C., and most preferably greater than about 5.0 ppm/° C.

The first glass composition is preferably a high-borate, low-soda lime-aluminosilicate glass composition having a borate content within the range of from about 14% to about 24% by weight. The second glass composition is preferably a high-soda, low-borate lime-aluminosilicate glass composition having a soda content within the range of from about 14% to about 25% by weight. The liquidus of each of the first and second glass compositions is at least 50° F. (28° C.) below that at which the glass viscosity is 1000 poise. Preferably the liquidus temperature is more than about 200° F. (111° C.) below that at which the glass viscosity is 1000 poise.

The chemical durability of each of the first and second glass compositions is less than about 4.0% and preferably less than about 2.5%. The dissolution rate in physiological fluid of each of the first and second glass compositions is greater than about 100 ng/cm$^2$ hr for the fiber in the final product.

In accordance with a further embodiment of the present invention, there is provided a dual-glass composition comprising a first glass composition and a second glass composition. One of the first and second glass compositions comprises by weight percent approximately 50–61% silica, 0–7% alumina, 9–13% lime, 0–5% magnesia, 14–24% borate, 0–10% soda, 0–2% potassium oxide. The other of the first and second glass compositions comprises by weight percent approximately 52–69% silica, 0–8% alumina, 6–10% lime, 0–7% magnesia, 0–8% borate, 14–25% soda, 0–2% potassium oxide.

Preferably, one of the first and second glass compositions comprises by weight approximately 52–57% silica, 4–6% alumina, 10–11% lime, 1–3% magnesia, 19–22% borate, 4–6% soda, 0–2% potassium oxide, and the other glass composition comprises by weight approximately 57–65% silica, 2–6% alumina, 8–9% lime, 4–6% magnesia, 0–6% borate, 15–21% soda, and 0–2% potassium oxide.

DETAILED DESCRIPTION OF THE PREFERRED EMBODIMENTS

Figure 1:
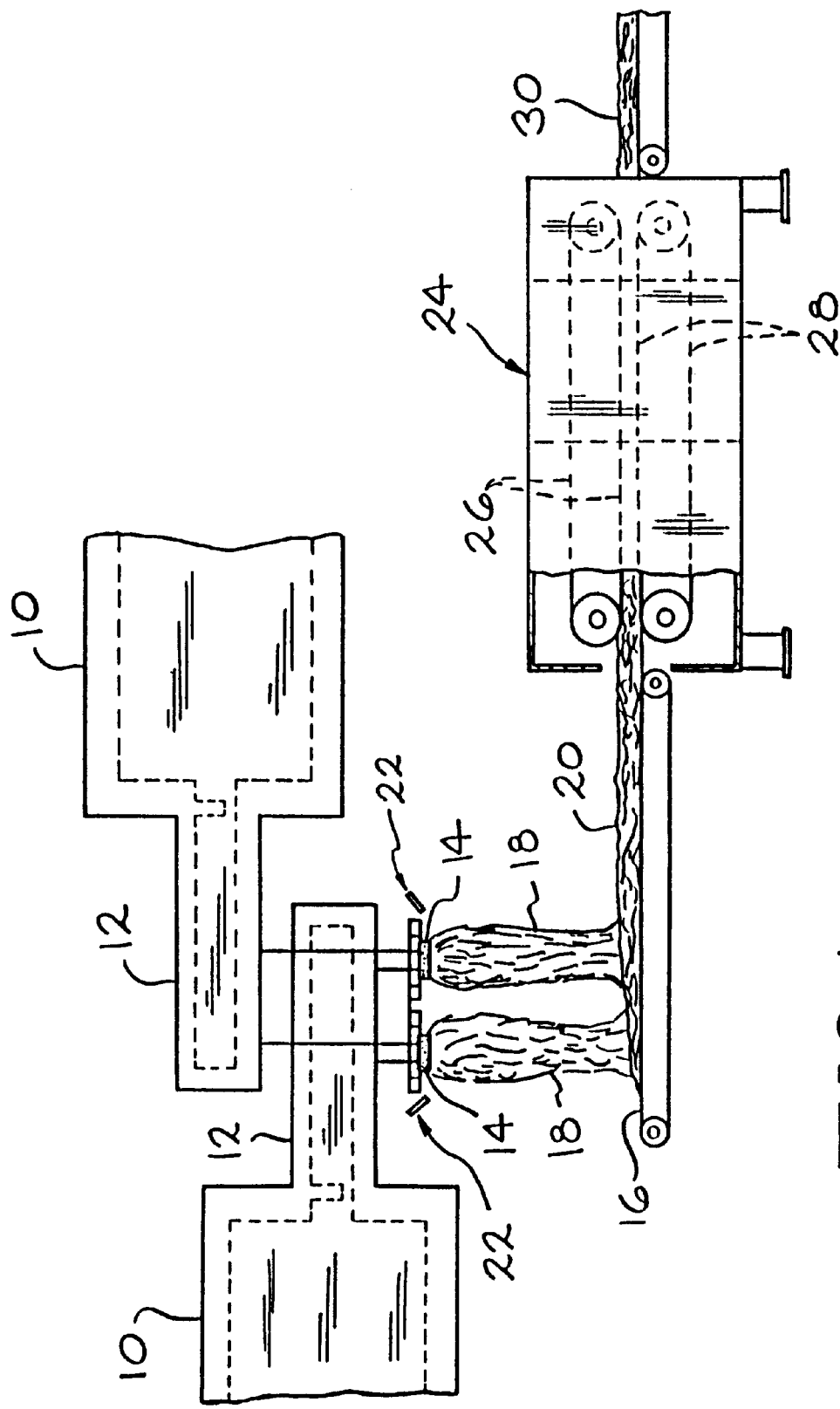
FIG. 1 is a schematic view in elevation of a heat setting process by which the insulation of the present invention may be produced.

The insulation products of irregularly-shaped glass fibers of the present invention can be produced from a rotary fiber forming and pack heat setting process as shown in FIG. 1.

Referring to FIG. 1, it can be seen that two distinct molten glass compositions are supplied from furnaces 10 via forehearths 12 to fiberizers 14. Veils of irregularly-shaped glass fibers 18 produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape.

The wool pack is then passed through oven 24 at heat setting temperatures from 700 to 1100° F. (371 to 593° C.). The heat setting temperature may be achieved either by maintaining the high temperature of the fibers in the fiber forming process or by reheating the fibers in the heat setting oven. While passing through the oven, the wool pack is shaped by top conveyor 26 and bottom conveyor 28, and by edge guides, not shown. While in the oven, the glass fibers may be subjected to flows of hot gases to facilitate uniform heating. After a period of up to 10 minutes, the wool pack then exits the oven as insulation product 30.

Figure 2:
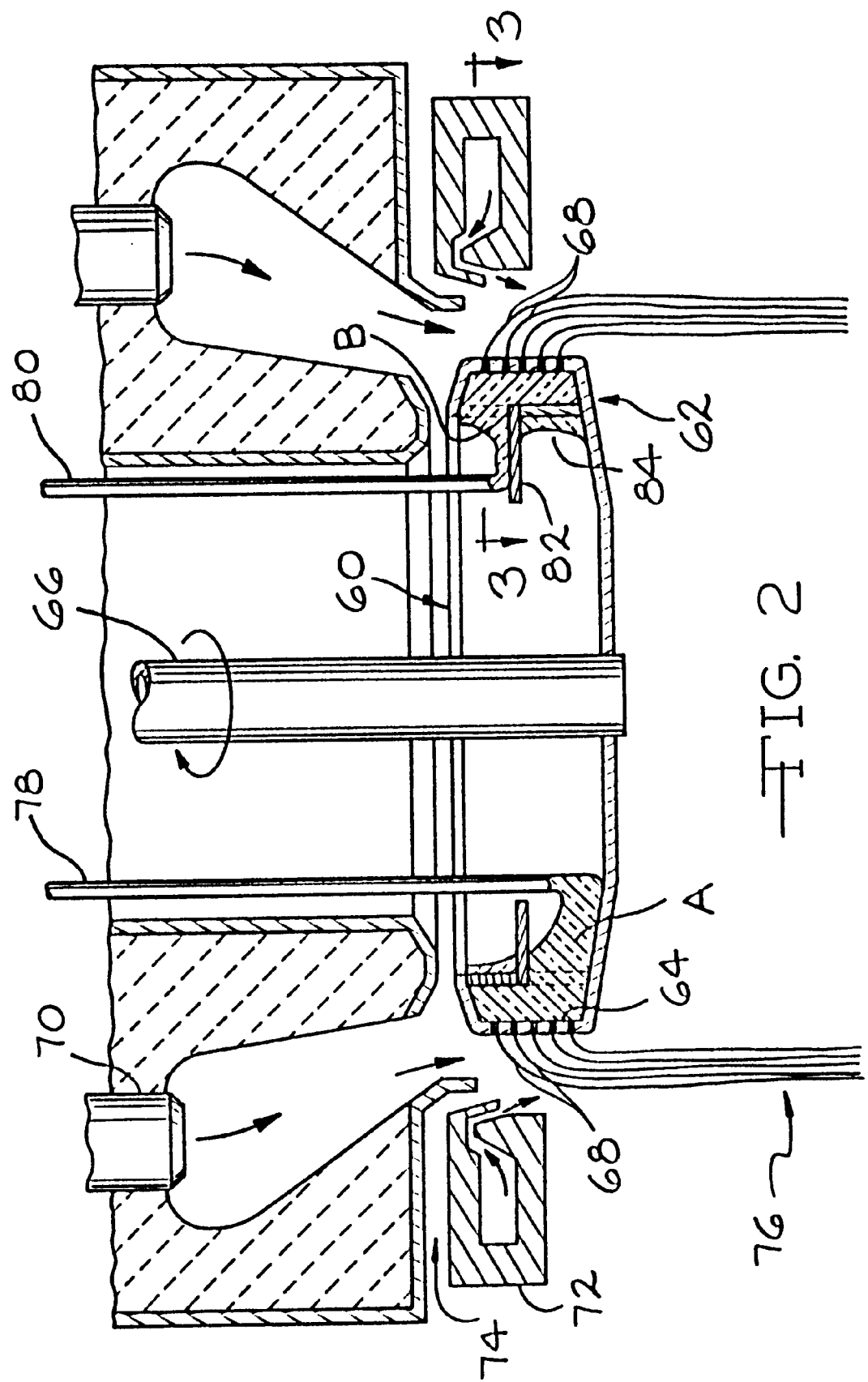
FIG. 2 is a cross-sectional view in elevation of a fiberizer by which the fibers of the present invention may be produced.

As shown in FIG. 2, spinner 60 is comprised of spinner bottom wall 62 and spinner peripheral wall 64. The spinner is rotated on spindle 66, as is known in the prior art. The rotation of the spinner centrifuges molten glass through the spinner peripheral wall into primary fibers 68. The primary fibers are maintained in soft, attenuable condition by the heat of annular burner 70. In one embodiment of the invention, an internal burner, not shown, provides heat to the interior of the spinner. Annular blower 72, using induced air 74, is positioned to pull the primary fibers and further attenuate them into secondary fibers 76, suitable for use in wool insulating materials. The secondary fibers, or bicomponent glass fibers, are then collected for formation into a wool pack.

The interior of the spinner is supplied with two separate streams of molten glass, first stream 78 containing glass A and second stream 80 containing glass B. The glass in stream 78 drops directly onto the spinner bottom wall and flows outwardly with centrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed on the horizontal flange.

Figure 3:
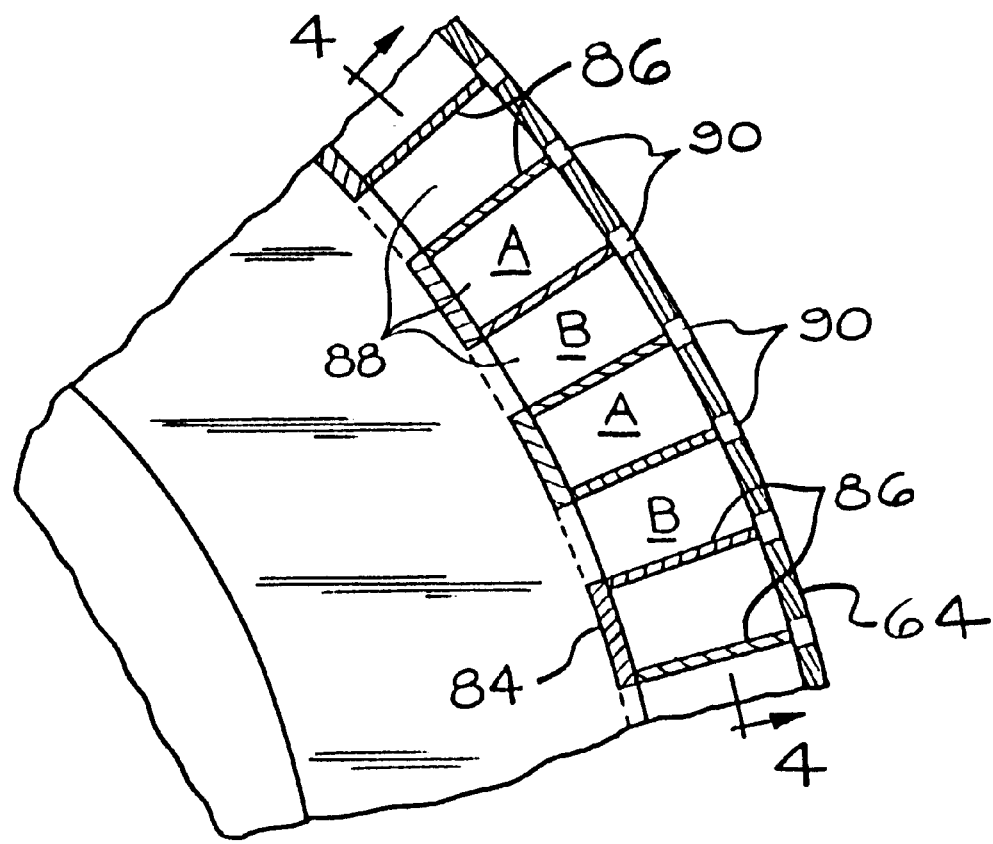
FIG. 3 is a plan view of a portion of the spinner of FIG. 2, taken along line 3—3.

As shown in FIG. 3, the spinner is adapted with vertical interior wall 84 which is generally circumferential and positioned radially inwardly from the spinner peripheral wall. A series of vertical baffles 86, positioned between the spinner peripheral wall and the vertical interior wall, divide that space into a series of compartments 88. Alternate compartments contain either glass A or glass B.

Figure 4:
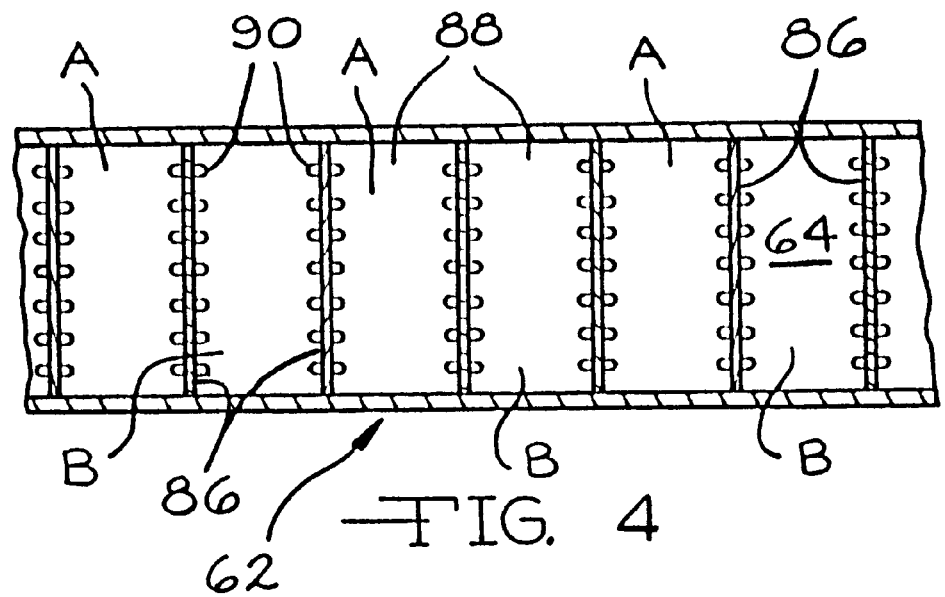
FIG. 4 is a schematic view in elevation of the spinner of FIG. 3 taken along line 4—4.

The spinner peripheral wall is adapted with orifices 90 which are positioned adjacent the radial outward end of the vertical baffle. The orifices have a width greater than the width of the vertical baffle, thereby enabling a flow of both glass A and glass B to emerge from the orifice as a single primary fiber. As can be seen in FIG. 4, each compartment 88 runs the entire height of spinner peripheral wall 64 with orifices along the entire vertical baffle separating the compartments. Other spinner configurations can be used to supply dual streams of glass to the spinner orifices.

Figure 5:
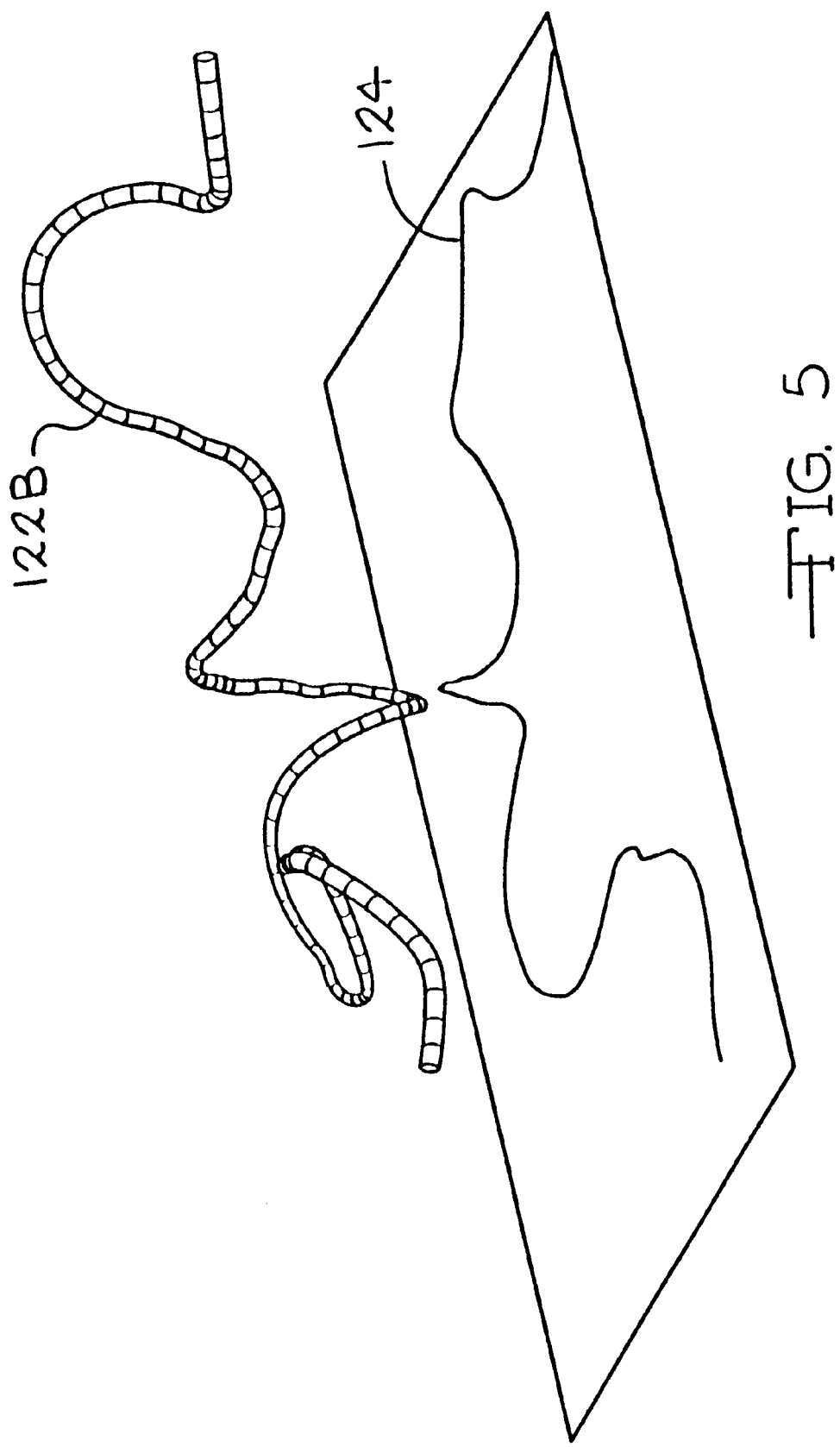
FIG. 5 is an artistically enhanced schematic view in perspective of the irregularly-shaped glass fiber of the invention.

Irregular fiber 122B, and shadow 124 shown in FIG. 5, give an artistically enhanced view of a fiber produced by the dual glass composition of the invention. The thickness of the fiber has been exaggerated and the segmentation lines have been added to show better perspective.

The number of glass compositions which are satisfactory for production of irregularly-shaped glass fiber by the method just described is actually quite small. The preferred glass compositions of the present invention are uniquely suited to that purpose. The compositions disclosed in Stalego are inoperable for making irregularly-shaped glass fibers.

There is no direct constraint on the values for the coefficient of thermal expansion of either glass A or glass B. However, there is a limitation on the difference in coefficient of thermal expansion between glass A and glass B. As the difference in coefficient of thermal expansion in part gives rise to the irregular shape of the fiber, this difference also controls the degree of bend in individual dual-glass fibers. The difference in the coefficient of thermal expansion must be sufficiently large to cause the right degree of bend in each dual-glass fiber to insure that the fibers are attenuated into irregularly-shaped glass fibers yielding the right amount of entanglement. If the difference is too small, the dual-glass fibers have too large a radius of curvature. Any wool insulating material made from these large radius of curvature fibers has low and, hence, unsatisfactory strength and recovery values. Large differences in the coefficient of thermal expansion require specialty glasses that cannot be produced with standard raw materials and, thus, are prohibitively expensive. For the present invention, the coefficients of thermal expansion of glass A and glass B, as measured on the individual glasses by standard dilatometer techniques, must differ by at least 2.0 ppm/° C. Preferably, the difference is greater than about 4.0 ppm/° C., and most preferably greater than about 5.0 ppm/° C.

In order for satisfactory commercial production of irregularly-shaped glass fibers, the glass composition must also satisfy several other constraints, the first of which is viscosity. It is customary in the art to describe the viscosity of the glass as that temperature at which the glass has a viscosity of 1000 poise. This measure is commonly referred to as the log3 viscosity temperature. For the present invention, the log3 viscosity temperature is within the range of from about 1850° F. (1010° C.) to about 2050° F. (1121° C.), preferably within the range of about 1900° F. (1037° C.) to about 2000° F. (1093° C.) and most preferably about 1950° F. (1065° C.).

Both the flow rate of glass through the spinner orifices and the rate of attenuation of the fibers are dependent on glass viscosity. If the viscosity is too high the flow of glass to the spinner orifices is reduced. This requires enlargement of the spinner orifices which, in turn, reduces the number of orifices possible for a given spinner design. Alternatively, the spinner temperature can be raised, but his reduces spinner life and, at some point, requires costly new spinner metallurgy. Additionally, higher viscosity glass requires greater blower flows and/or higher temperatures in the environment of the spinner face where glass fibers are attenuated. This resulting higher temperature reduces overall spinner life and would require costly spinner metallurgy.

The log3 viscosity temperatures of both glass A and glass B in the dual-glass composition of the present invention are preferably within about 75° F. (42° C.) of each other. A large mismatch in the log3 viscosity temperature would lead to one of two unacceptable results. At higher spinner temperatures, all the flow of the more fluid glass would be through orifices it encounters early in its pathway in the spinner. This could leave some orifices starved of the more fluid glass and cause them to make essentially single-component fibers. Alternatively, if the spinner temperature is lowered, the level of the less fluid glass would build up in the spinner until it overflowed the top flange. For a glass pair with a large mismatch in viscosity, both these results could occur simultaneously.

An additional constraint the glass of the present invention must satisfy is that of liquidus. The liquidus of a glass is the highest temperature at which crystals are stable in the molten glass. With sufficient time, a glass at a temperature below its liquidus will crystallize. Crystallization in the furnace and forehearth can lead to the formation of solid particles which, once passed to the fiberizer, become lodged in the orifices of the spinner, plugging them. Spinner orifices may also become blocked by crystals growing directly in the spinner if the temperature of the spinner face at some point remains below the liquidus for several hours or more. To avoid glass crystallization in the spinner orifices, the difference between the log3 viscosity temperature and the liquidus for each of glass A and glass B of the dual-glass composition in the present invention must be at least 50° F. (28° C.), and preferably more than about 200° F. (111° C.) lower than the log3 viscosity temperature. If this constraint is not met, crystallization will typically occur in the lower (i.e., colder) part of the spinner blocking the spinner's orifices.

A further constraint on the glass composition of the present invention is glass chemical durability. Chemical durability relates to two glass wool pack properties. The first is the ability of the glass wool pack to recover when it is opened for installation. The second is the long term physical integrity of the glass wool pack. If the glass chemical durability is too low, upon installation the glass wool pack could fail to recover to its design thickness. Whether the wool pack fails to fully recover or disintegrates too quickly, the result is a failure of the wool pack to adequately insulate.

A useful measure of the chemical durability of a glass fiber for an insulation application is obtained by measuring the percent weight loss of 1 gram of 10 micrometer diameter fibers after 2 hours in 0.1 liters of distilled water at 205° F. (96° C.). The durability so measured depends strongly on the composition of the glass fibers and, to a lesser, extent, on the thermal history of the fiber. To assure adequate performance of the wool pack, fibers of each of the dual glass compositions should exhibit a weight loss in this test of less than about 4% and preferably less than about 2.5%. In addition to its strong dependence on glass composition, the chemical durability of a glass fiber depends to a lesser extent on its thermal history. Thus, for example, heating a glass fiber for several minutes at 1000° F. (538° C.), will improve its chemical durability somewhat. It is understood that the limits on chemical durability disclosed here refer to measurements on glass fibers with no heat treatment other than that employed in their original attenuation.

Since glass wool insulation typically contains some fibers that are thin enough to be respirable if they break into short lengths, it is possible that some fibers may become airborne and be inhaled. In the body, they will be exposed to physiological fluids. To the extent that the dissolution rate of the fibers in the body plays a role in the biological activity of inhaled fibers, it may be preferable to produce glass fibers with a relatively high dissolution rate in such fluids. The dissolution rate of glass fibers is expressed as the dissolution rate constant measured for fibers in simulated lung fluid at 98° F. (37° C.). It depends strongly on the glass fiber composition and, to a lesser extent, on its thermal history. It is preferable to use glass compositions having a dissolution rate constant of at least 100 ng/cm$^2$ hr for all insulation fibers. Therefore, it is preferable for the dissolution rate constant for fibers of each of the dual glass compositions to be at least 100 ng/cm$^2$ hr. As with the chemical durability, subsequent heat treatment of the fiber will reduce its dissolution rate. The 100 ng/cm$^2$ hr limit refers to fibers formed into a wool insulation pack in the final product form.

As one can easily see, selecting a dual-glass composition for the production of irregularly-shaped glass fibers is extremely complex. Each of the individual glass compositions, A and B, must satisfy narrow log3 viscosity temperature, liquidus, and durability constraints. In addition, the differentials between the coefficients of thermal expansion and log3 viscosity temperatures of the two glasses must be within the required ranges. Preferably, the dissolution rates also fall within desired ranges.

The dual-glass compositions of the present invention comprising one high-borate, low-soda lime-aluminosilicate composition as glass A and one high-soda, low-borate lime-aluminosilicate composition as glass B satisfy all constraints necessary for a successful irregularly-shaped fiber. By high-borate, low-soda lime-aluminosilicate composition, it is intended that the glass composition have a borate content of within the range of about 14% to about 24% by weight of the total components. By a high-soda, low-borate lime-aluminosilicate composition, it is intended that the glass composition have a soda content of within the range of about 14% to about 25% by weight of the total components.

Preferably, the first glass composition comprises by weight percent from about 50 to about 61% silica or $SiO_2$ from about 0 to about 7% alumina or $Al_2O_3$, from about 9 to about 13% lime or CaO, from about 0 to about 5% magnesia or MgO, from about 14–24% borate or $B_2O_3$, from about 0 to about 10% soda or $Na_2O$, and from about 0 to about 2% potassium oxide or $K_2O$.

The second glass composition is preferably one which comprises by weight percent from about 52 to about 60% silica or $SiO_2$, from about 0 to about 8% alumina or $Al_2O_3$, from about 6 to about 10% lime or CaO, from about 0 to about 7% magnesia or MgO, from about 0 to about 6% borate or $B_2O_3$, from about 14 to about 25% soda or $Na_2O$, and from about 0 to about 2% potassium oxide or $K_2O$. It is understood that in each composition there will typically be less than about 1% total of various other constituents such as, for example $Fe_2O_3$, $TiO_2$ and SrO, not intentionally added to the glass, but resulting from the raw materials used in the batch formulation.

More preferably, the dual-glass composition of the present invention comprises a first glass composition containing approximately 52–57% silica, 4–6% alumina, 10–11% lime, 1–3% magnesia, 19–22% borate, 4–6% soda, 0–2% potassium oxide, and a second glass composition containing approximately 57–65% silica, 2–6% alumina, 8–9% lime, 4–6% magnesia, 0–6% borate, 15–21% soda, and 0–2% potassium oxide.

Proper dissolution rate is an important aspect of the present invention. High soda glasses with adequate chemical durability customarily have low dissolution rates. The traditional means for solving low dissolution rate values in these high soda glasses has been to add borate to the glass composition. However, adding borate is not a solution because the present invention requires one composition of a high-soda, low-borate glass in order to achieve a difference in coefficient of thermal expansion in the required range. Because of the difficulty in selecting pairs of durable glasses meeting both the dissolution rate requirements and the need for a significant differential in coefficient of thermal expansion, the glass compositions of the invention are not readily obvious.

EXAMPLES

Several dual-glass compositions were mixed and irregularly-shaped glass fibers produced. The irregularly-shaped glass fibers were generated by a batch-mode process. 10 pounds of each glass composition were mixed and melted. Fibers were then produced using a 40 hole laboratory test spinner. The log3 viscosity temperature, liquidus, coefficient of thermal expansion, chemical durability and dissolution rate were determined for each glass composition A through H. The compositions and results are summarized in Table 1 on page 14a.

Pair 1 is a dual-glass composition according to the present invention. Pair 1 proved to be satisfactory in terms of chemical durability, dissolution rate, lack of devitrification, and in the recovery of the resulting product. Pair 2, while within the compositional ranges of the present invention, was not satisfactory because of the poor chemical durability of glass D. Pair 3 was outside the compositional ranges of the present invention and was not satisfactory because of the low coefficient of thermal expansion differential. Pair 4 was within the compositional ranges of the present invention, but was not satisfactory because of the low dissolution rate of glass H.

I claim:

1. Irregularly-shaped glass fibers suitable for insulation comprising first and second glass compositions having:

a. nonidentical coefficients of thermal expansion, the nonidentical coefficients of thermal expansion having a difference greater than about 2.0 ppm/° C.,
   b. log3 viscosity temperatures within the range of from about 1850 to about 2050° F. (1010 to 1121° C.),
   c. liquidus temperatures of at least 50° F. (28° C.) below that of the log3 viscosity temperatures, and
   d. chemical durabilities of less than about 4.0% wherein the glass fibers comprise two components wherein one component is made of the first glass composition and the second component is made of the second glass composition.

2. The irregularly-shaped glass fiber according to claim 1, wherein the difference in the nonidentical coefficients of thermal expansion is greater than about 4.0 ppm/° C.

3. The irregularly-shaped glass fiber according to claim 2, wherein the difference in the nonidentical coefficients of thermal expansion is greater than about 5.0 ppm/° C.

4. The irregularly-shaped glass fiber according to claim 1, wherein the first and second glass compositions have log3 viscosity temperatures within the range of from about 1900 to about 2000° F. (1037 to 1093° C.).

5. The irregularly-shaped glass fiber according to claim 4 wherein the first and second glass compositions have chemical durabilities less than about 2.5%.

6. The irregularly-shaped glass fiber according to claim 5, wherein the first and second glass compositions have liquidus temperatures at least 200° F. (111° C.) below that of their log3 viscosity temperatures.

7. The irregularly-shaped glass fiber according to claim 4, wherein the first and second glass compositions have liquidus temperatures at least 200° F. (111° C.) below that of the log3 viscosity temperatures.

8. The irregularly-shaped glass fiber according to claim 7, wherein the first and second glass compositions have chemical durabilities less than about 2.5%.

9. The irregularly-shaped glass fiber according to claim 1, wherein the first and second glass compositions have chemical durabilities less than about 2.5%.

10. The irregularly-shaped glass fiber according to claim 1, wherein each of the first and second glass compositions has a dissolution rate of at least 100 ng/cm$^2$ hr in a simulated lung solution.

TABLE 1

|  | Pair 1 | | Pair 2 | | Pair 3 | | Pair 4 | |
| --- | --- | --- | --- | --- | --- | --- | --- | --- |
|  | glass A | glass B | glass C | glass D | glass E | glass F | glass G | glass H |
| Composition (starting batch): | | | | | | | | |
| $SiO_2$ | 55.97 | 63.48 | 55.48 | 62.32 | 64.66 | 63.47 | 59.54 | 61.24 |
| $Al_2O_3$ | 5.13 | 3.50 | 5.00 | 3.00 | 1.44 | 3.77 | 4.45 | 6.68 |
| CaO | 9.91 | 8.67 | 10.69 | 6.36 | 8.81 | 8.40 | 8.65 | 6.00 |
| MgO | 1.03 | 3.00 | 1.17 | 4.42 | 3.91 | 3.08 | 1.42 | 0.94 |
| $B_2O_3$ | 20.00 | 1.77 | 20.00 | 0.00 | 7.30 | 2.53 | 16.17 | 2.38 |
| $Na_2O$ | 6.21 | 18.51 | 5.94 | 23.00 | 13.38 | 18.31 | 9.00 | 21.00 |
| $K_2O$ | 1.16 | 0.80 | 1.13 | 0.69 | 0.10 | 0.10 | 0.09 | 1.50 |
| $Fe_2O_3$ | 0.17 | 0.19 | 0.17 | 0.17 | 0.17 | 0.17 | 0.17 | 0.17 |
| SrO | 0.39 | 0.04 | 0.39 | 0.00 | 0.14 | 0.0-0 | 0.31 | 0.05 |
| $TiO_2$ | 0.03 | 0.04 | 0.03 | 0.04 | 0.09 | 0.17 | 0.20 | 0.04 |
| Total | 100.00 | 100.00 | 100.00 | 100.00 | 100.00 | 100.00 | 100.00 | 100.00 |
| Physical properties: | | | | | | | | |
| log3 visc (° F.) | 1946 | 1950 | 1940 | 1920 | 1936 | 1943 | 1948 | 1955 |
| liquidus (° F.) | 1676 | 1738 | 1777 | 1771 | 1783 | 1741 | 1710 | 1643 |
| durability | 2.4 | 2.5 | 1.9 | 5.0 | 2.1 | 2.2 | 1.2 | 1.1 |
| (ppm/° C.) | 6.3 | 10.1 | 6.4 | 12.4 | 9.1 | 10.7 | 6.8 | 11.4 |
| $K_{dis}$ (ng/cm$^2$hr) | 7950 | 180 | 1750 | 340 | 440 | 90 | 850 | 10 | coefficient of thermal expansion = ≃
dissolution rate - $K_{dis}$

11. The irregularly-shaped glass fiber according to claim 1, wherein the log3 viscosity temperatures of the first and second glass compositions are within about 75° F. (42° C.) of each other.

12. The irregularly-shaped glass fiber according to claim 1, wherein the first composition is a high-borate, low soda lime-aluminosilicate composition and the second glass composition is a high-soda, low borate lime-aluminosilicate composition.

13. The irregularly-shaped glass fiber according to claim 12, wherein the high-borate, low-soda lime-aluminosilicate composition has a boron content within the range of from about 14 to about 25% by weight.

14. The irregularly-shaped glass fiber according to claim 12, wherein the high-soda, low-borate lime-aluminosilicate composition has a soda content from within the range of from about 14 to about 25% by weight.

15. Irregularly-shaped glass fibers suitable for insulation comprising:

a first glass composition and a second glass composition, the first glass composition comprising by weight percent approximately 50–61% silica, 0–7% alumina, 9–13% lime, 0–5% magnesia, 14–24% borate, 0–10% soda, and 0–2% potassium oxide, the second glass composition comprising by weight percent approximately 52–69% silica, 0–8% alumina, 6–10% lime, 0–7% magnesia, 0–8% borate, 14–25% soda, 0–2% potassium oxide, and wherein the glass fibers comprise two components wherein one component is made of the first glass composition and the second component is made of the second glass composition.

16. The irregularly-shaped glass fiber according to claim 15, wherein:

the first glass composition comprises by weight percent approximately 52–57% silica, 4–6% alumina, 10–11% lime, 1–3% magnesia, 19–22% borate, 4–6% soda, 0–2% potassium oxide, and the second glass composition comprises by weight percent approximately 57–65% silica, 2–6% alumina, 8–9% lime, 4–6% magnesia, 0–6% borate, 15–21% soda, and 0–2% potassium oxide.

17. The irregularly-shaped glass fiber according to claim 15, wherein the first and second glass compositions have non-identical coefficients of thermal expansion, and the nonidentical coefficients of thermal expansion have a difference greater than about 4.0 ppm/° C.

18. The irregularly-shaped glass fiber according to claim 15, wherein the first and second glass compositions have log3 viscosity temperatures within the range of about 1850 to about 2050° F. (1010 to 1121° C.).

19. The irregularly-shaped glass fiber according to claim 15, wherein the first and second glass compositions have liquidus temperatures of at least 50° F. (28° C.) below that of their log3 viscosity temperatures.

20. The irregularly-shaped glass fiber according to claim 15, wherein the first and second glass compositions have a chemical durability of less than about 4.0%.

* * * * *